(12) United States Patent
Kuvettu et al.

(10) Patent No.: US 6,355,591 B1
(45) Date of Patent: Mar. 12, 2002

(54) PROCESS FOR THE PREPARATION OF FLUID CATALYTIC CRACKING CATALYST ADDITIVE COMPOSITION

(75) Inventors: Mohan Prabhu Kuvettu; Gopal Ravi Chandran; Sanjay Kumar Ray; Kamlesh Gupta; Ganga Shankar Misra; Venkatachalam Krishnan; Mitra Bhanu Patel; Satish Makhija; Sobhan Ghosh, all of Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 09/477,087

(22) Filed: Jan. 3, 2000

(51) Int. Cl.⁷ .................... B01J 29/18; B01J 29/40; B01J 29/70
(52) U.S. Cl. .................... 502/68; 502/64; 502/71; 502/77; 502/78
(58) Field of Search .................... 502/60, 64, 68, 502/71, 77, 78

(56) References Cited

U.S. PATENT DOCUMENTS

| | | | | |
|---|---|---|---|---|
| 3,649,523 A | | 3/1972 | Bertolacini et al. ......... 208/111 |
| 3,801,704 A | * | 4/1974 | Kobayashi et al. | |
| 3,943,231 A | * | 3/1976 | Wasel-Nielen et al. | |
| 3,999,999 A | * | 12/1976 | Henton | |
| 4,083,933 A | * | 4/1978 | Schlegel | |
| 4,454,241 A | | 6/1984 | Pine et al. ................. 502/68 |
| 4,584,091 A | | 4/1986 | Pine ....................... 252/455 |
| 4,873,211 A | | 10/1989 | Walker et al. ............. 502/64 |
| 5,190,902 A | | 3/1993 | Demmel .................... 502/63 |
| 5,350,447 A | * | 9/1994 | Copes | |
| 5,380,690 A | | 1/1995 | Zhicheng et al. ........... 502/65 |
| 5,552,361 A | | 9/1996 | Rieser et al. ............. 502/208 |

FOREIGN PATENT DOCUMENTS

EP    0 496 226 A1   *   7/1992

* cited by examiner

Primary Examiner—Steven P. Griffin
Assistant Examiner—Christina Ildebrando
(74) Attorney, Agent, or Firm—Ladas & Parry

(57) ABSTRACT

A fluid catalytic cracking additive composition to obtain enhanced yield of Liquified Petroleum Gas in catalytic cracking of high boiling petroleum feed stocks comprising 4 to 20 wt. % aluminum phosphate composite, 1-40 wt. % crystalline molecular sieve Zeolites from the group selected from mordenite ZSM-5, Beta and mixtures thereof and 40-90 wt. % clay.

5 Claims, No Drawings

PROCESS FOR THE PREPARATION OF FLUID CATALYTIC CRACKING CATALYST ADDITIVE COMPOSITION

The subject invention relates to a fluid catalytic cracking catalyst additive composition and a process for the preparation of the same.

More specifically, the subject invention relates to a fluid catalytic cracking catalyst additive composition comprising molecular sieve zeolites, aluminum Phosphate composite derived from aluminum metal, Phosphoric acid and clay.

The object of the invention is to obtain the enhanced yield of Liquefied Petroleum Gas (LPG) by catalytic cracking of high boiling petroleum feedstocks.

The other object of the invention is to provide a fluid catalytic cracking additive which is resistant to attrition.

Catalytic cracking processes in which a hydrocarbonaceous oil is converted to lower boiling hydrocarbon products in the presence of cracking catalysts are well known. Catalyst comprising a zeolite and a silica alumina residue made from calcined clay starting material in which the zeolite is produced in the clay are claimed in U.S. Pat. No. 3,663,165.

British Patent No. 1,524,123 discloses the preparation of clay derived zeolite where the sodium content of the catalyst is reduced to less than 1 weight percent.

U.S. Pat. No. 4,454,241 claims a catalyst comprising a crystalline aluminosilicate zeolite prepared form a clay starting material, a residue derived from said clay and an effective amount of phosphorous Further, U.S. Pat. No. 4,873,211 discloses the cracking catalyst composition comprising zeolite and a matrix material comprising aluminum phosphate which is substantially free from alumina and magnesia, where slurry of a zeolite is mixed with a slurry of aluminum phosphate.

Zeolitic materials both natural and synthetic have been demonstrated in the past to have catalytic capabilities for various types of hydrocarbon conversion. Certain zeolites are ordered, porous crystalline structures within which there are a large number of small cavities which are interconnected by a number of still smaller channels. These cavities and channels are precisely uniform in size. Since the dimensions of these pores are such so as to accept for adsorption molecules of certain dimensions while rejecting those of larger dimensions., these materials have come to be known as "molecular sieves" and are utilized in a variety of ways to take advantage of these properties. Prior art techniques have resulted in the formation of great variety of synthetic crystalline aluminosilicates. These aluminosilicates have come to be designated by letter or other convenient symbols, to name the few the same are illustrated as "Zeolite A" claimed in U.S. Pat. No. 2,882,243, "Zeolite X" claimed in U.S. Pat. No. 2,882,244, "Zeolite Y" claimed in U.S. Pat. No. 3,130,007, "Zeolite K-G" claimed in U.S. Pat. No. 3,055,654, Zeolite ZK-5 claimed in U.S. Pat. No. 3,247,195, "Zeolite Beta" claimed in U.S. Pat. No. 3,308,069, "Zeolite ZK-4" claimed in U.S. Pat. No. 3,314,752 and "Zeolite ZSM-5" claimed in U.S. Pat. No. 3,702,886.

Members of family of zeolites designated as ZSM-5 have an exceptionally high degree of thermal stability thereby rendering them particularly effective for use in process involving elevated temperatures. Zeolite ZSM-5 have found to be one of the most stable families of zeolites. Zeolites ZSM-5 are useful in cracking and hydrocracking, they are outstandingly useful in other petroleum refining processes as claimed in U.S. Pat. No. 3,702,886.

The catalytic composition comprising (1) a metal from Group VI-A of the Periodic Table of Elements and a metal from Group VIII of the Periodic Table of Elements, (2) their Oxides, (3) their Sulfides and (4) mixtures thereof and a co-catalytic acidic support comprising a large pore crystalline aluminosilicate material and a porous support material selected from the group consisting of alumina, aluminum phosphate and silica have been claimed in U.S. Pat. No. 3,649, 523.

U.S. Pat. No. 5,190,902 has described the use of aluminum phosphate binder material in formulating cracking catalyst where as aluminum phosphate as catalyst support material is described in U.S. Pat. No. 5,55,2361 wherein high surface area aluminum phosphate has been prepared from aluminum nitrate and phosphoric acid.

Further, U.S. Pat. No. 5,380,690 discloses a process for in-situ phosphorous addition into the zeolite framework and subsequent use in cracking catalyst formulation.

The available prior art compositions though possess catalytic properties but there is always a need to produce improved catalyst additives that are capable of producing enhanced yields of liquefied petroleum gas as compared to the available conventional catalyst compositions.

The embodiment of the invention resides in developing a process for preparing a aluminum phosphate composite using aluminum metal and phosphoric acid and the composition thereof.

In the process for preparing the FCC catalyst additive, the aluminum metal powder is mixed with phosphoric acid solution containing 20–86 wt % $H_3PO_4$ to obtain a aluminum phosphate having a pH of from 0.5 to 0.9 and Al to $PO_4$ molar ratio of from 1–3, the aluminum phosphate so obtained is mixed with clay (Kaolin) to get a resultant mixture, the said resultant mixture is then combined with aqueous slurries of zeolite as ZSM-5 under high sheer mixing condition to obtain a spray drier feed slurry that contains 20 to 45 wt % solids preferably comprising 4 to 20 wt % aluminum phosphate, 1–40 wt % ZSM-5 and 40–90 wt % Kaolin.

The catalyst additive slurry is held in a spray dryer feed storage tank under mixing conditions until spray dried and calcined for one hour at a temperature of 450–600° C. During the drying process the aluminum phosphate solution is converted into a binder.

The spray dried FCC catalyst additive of the subject invention has a particle size of 20–150 microns. The subject additives are used in the conventional fluid cracking catalyst unit wherein the FCC catalyst are reacted with hydrocarbon feedstock at 400–700° C. and regenerated at 500–850° C. to remove coke. The subject additives are having the attrition index of 3–15, preferably 5–10.

Accordingly, the subject invention relates to a fluid catalytic cracking additive composition to obtain enhanced yield of Liquefied Petroleum Gas in catalytic cracking of high boiling petroleum feed stocks comprising 4 to 20 wt % aluminum phosphate composite, 1–40 wt % crystalline molecular sieve zeolites from the group selected from mordenite ZSM-5, Beta and mixtures thereof and 40–90 wt % clay.

More specifically, the invention relates to a fluid catalytic cracking additive composition to obtain enhanced yield of Liquefied Petroleum Gas in catalytic cracking of high boiling petroleum feed stocks comprising 4 to 20 wt % aluminum phosphate composite, 1–40 wt % ZSM-5 and 40–90 wt % Kaolin.

The subject invention also relates to a process for the preparation of fluid catalytic cracking additive composition to obtain enhanced yield of Liquefied Petroleum Gas in catalytic cracking of high boiling petroleum feed stocks comprising:

i) reacting the aluminum metal powder with phosphoric acid solution containing 20–86 wt % $H_3PO_4$ to obtain aluminum phosphate composite, ii) mixing aluminum phosphate composite with clay to get a resultant mixture, (iii) adding the said resultant mixture to aqueous slurries of crystalline molecular sieve zeolites selected from the group consisting of mordenite ZSM-5, Beta and mixtures thereof, under high sheer mixing condition to obtain a spray drier feed slurry containing 20 to 45 wt % solids, (iv) spray drying the above feed to get the micropore of 20–150 micron size and (v) calcining the sample for one hour at a temperature of 450–600° C.

More specifically the invention relates to a process for the preparation of fluid catalytic cracking additive composition to obtain enhanced yield of Liquefied Petroleum Gas in catalytic cracking of high boiling petroleum feed stocks comprising:

i) reacting the aluminum metal powder with phosphoric acid solution containing 20–86 wt % $H_3PO_4$ to obtain aluminum phosphate composite;

ii) mixing aluminum phosphate composite with Kaolin clay to get a resultant mixture, (iii) adding the said resultant mixture to aqueous slurries of ZSM-5 under high sheer mixing condition to obtain a spray drier feed slurry containing 20 to 45 wt % solids, (iv) spray drying the above feed to get the micropore of 20–150 micron size and (v) calcining the sample for one hour at a temperature of 450–600° C.

The attrition index was determined by calcining the additives at a temperature of 538° C. for 3 hours prior to the measurement for attrition resistance. The additive attrition at high, constant air jet velocity was measured. The fines were removed continuously from the attrition zone by elutriation into a flask-thimble assembly and weighed at periodic intervals the percent attrition is calculated by the formula:

$$\text{Percent Attrition} = \frac{\text{Grams overhead in 5--20 hours period} * 100}{50 \text{ gms. charge} - \text{gms. overhead in 0--5 hrs. period}}$$

Percent attrition is also referred as attrition index. The lower the index, the better is the attrition index property of additive.

The zeolite component used in the subject invention may comprise any acid resistant zeolite or molecular sieve having a silica to alumina molar ratio in excess of about 8, preferably from 15 to .

The aluminum phosphate used in the subject invention acts as binder and also modifies zeolite acidity and pore size. The modification in the zeolite acidity and pore size is achieved when the aluminum from the aluminum phosphate composite occupies zeolite pores and moderates the zeolite acidity and pore thus boosting LPG during cracking reactions.

The aluminum phosphate composite of the subject invention is prepared by mixing aluminum metal with phosphoric acid in the amounts to obtain an Al to $PO_4$ ratio of 1 to 3, pH of below 2 and solid concentration of 20–70 wt % as aluminum phosphate composite.

The clay used in the subject composition is preferably Kaolin having a surface area of about 10 to 30 $m^2/g$.

Other finely divided inorganic components such as other types of clays, silica, alumina, silica-alumina gels and the like may also be included in the subject catalyst composition.

The composition of the subject invention comprises clay from 45–80 wt %, aluminum phosphate from 4–20 wt % and zeolites from 1–40 wt %.

EXAMPLES

Example 1

Preparation of aluminum phosphate composite 122.3 gm of phosphoric acid (85 wt %, LR grade) solution is diluted with 125 gms of dimineralised water (DM) mixed well and transferred into a RB flask fitted with condenser. 12 gm of aluminum metal (LR grade) is added slowly while stirring at the rate of 0.5 gms at a time. After completion of addition of aluminum metal, 56 gms of water is added to flush off the metal sticking to the walls of the flask to get the transparent liquid. The chemical analysis on this solution showed the following chemical composition (weight basis)

| | |
|---|---|
| Aluminum | 4 |
| $PO_4$ | 35 |
| Water | 61 |

Part of the samples was dried at 110° C. for 6 hours and calcined at 538° C. for 1 hour. Subsequently the sample was characterised by X Ray Diffraction technique using a Rigaku XRD instrument in the 2 theta range of 10 to 23 degrees at a scanning speed of 4 degree/min and a step size of 0.01 degree. The general experimental conditions employed for recording XRD patterns are as follows:

| | | |
|---|---|---|
| 1 | Power | 40 KV & 50 mA |
| 2 | Monochromator | Graphite |
| 3 | Counter | Scintillation counter |
| 4 | Dispersing slit | 1 degree |
| 5 | Receiving slit | 0.15 degree |
| 6 | Solar slit | 1 Degree |

On calcination the aluminum phosphate underwent transition to a phase of Aluminum Phosphate $Al(PO_4)_3$. This phase matches with pure aluminum phosphate crystalline phase 'd' values and intensities and are given in the table below:

| Sample of the present invention Experiment 1 | | | | | |
|---|---|---|---|---|---|
| D, Å | 2 theta, Degrees | Intensity | d, Å | 2 theta degrees | Intensity |
| 5.495 | 16.118 | 100 | 5.473 | 16.18 | 100 |
| 5.464 | 16.207 | 70 | | | |
| 5.128 | 17.278 | 70 | 5.122 | 17.28 | 29 |
| 4.425 | 20.051 | 70 | 4.418 | 20.08 | 31 |
| 5.882 | 15.049 | 60 | 5.885 | 15.04 | 13 |
| 3.774 | 23.557 | 60 | 3.771 | 23.57 | 25 |
| 3.509 | 25.364 | 60 | 3.506 | 25.38 | 22 |
| 4.065 | 21.846 | 50 | 4.068 | 21.83 | 15 |
| 3.817 | 23.287 | 50 | 3.825 | 23.23 | 12 |
| 3.663 | 24.279 | 50 | 3.661 | 24.29 | 15 |
| 7.519 | 11.761 | 40 | 7.538 | 11.73 | 7 |
| 6.993 | 12.648 | 40 | 7.014 | 12.61 | 5 |
| 3.690 | 24.098 | 40 | 3.692 | 24.08 | 6 |
| 4.237 | 20.948 | 30 | 4.244 | 20.91 | 4 |
| 3.953 | 22.476 | 30 | 3.958 | 22.44 | 4 |

Surface area of the sample was measured in FLOWSORB 2300 using nitrogen absorption isotherm and BET approximations. Nitrogen gas was adsorbed at different partial pressures as liquid nitrogen temperatures and the resultant gas intake was measured to get a multipoint isotherm. The surface area of the calcined sample was found to be 3.5 $m^2/g$.

Example 2

Formulation of FCC catalyst additive using zeolite phosphate and clay.

200 gms of aluminum phosphate prepared by the process disclosed in Example 1 was diluted with 200 gm demineralised (DM) water and to it 708 gms of Kaolin clay (moisture 14.5 wt %, source BCK grade) was added. The clay was milled in a ball mill instrument prior to addition. The slurry having pH of 2 was aged for one hour at 20° C. 100 gm (volatile free basis) ZSM-5 zeolite was slurried with 160 ml of demineralised water and milled. It was added to the earlier prepared clay-phoshpate mixture and the resulting slurry was thoroughly mixed. The slurry with solid concentration of 30 wt % was spray dried with a feed rate of 80 g/min. The spray dried microspheres were then calcinated at 500° C. for one hour.

The microspheres so obtained were sieved and 100⁻ and 325⁺ mesh fraction was selected for further characterization. The additives were then analyzed for surface area, which was found to be 57 m$^2$/g. The attrition resistance index measured and found to be 3.5 wt %.

The calcined additives was steam deactivated at 750° C. for three hours and was evaluated for performance at ASTM MAT conditions with IOC standard feed (Table 1). The performance data as shown in Table 2 compared with base case where host catalyst does not contain any additives. It is seen from the table that compared to base case, the FCC catalyst aditive formulation prepared as per the process of present invention provides enhanced LPG yields.

TABLE 1

IOC Standard Feedstock

| Wt % | ° C. |
|---|---|
| IBP | 315 |
| 5 | 327 |
| 10 | 334 |
| 20 | 346 |
| 30 | 356 |
| 40 | 365 |
| 50 | 375 |
| 60 | 386 |
| 70 | 399 |
| 80 | 415 |
| 90 | 440 |
| 95 | 463 |
| FBP | 528 |
| Pour point, ° C. | 36 |
| Density @ 15° C. (g/cc) | 0.87 |
| CCR (wt %) | 0.008 |
| RCR (wt %) | 0.04 |

TABLE 2

| SAMPLE NO. | BASE CASE (WITHOUT ADDITIVES) | WITH ADDITIVES |
|---|---|---|
| Conversion, wt % yields | 72 | 73 |
| Hydrogen | 0.02 | 0.02 |
| Gas | 0.72 | 0.80 |
| LPG | 18.08 | 34.23 |
| Gasoline | 38.72 | 28.39 |
| HN | 12.54 | 7.36 |
| LCO | 22.72 | 21.77 |
| TCO | 35.26 | 29.13 |
| 370+ | 5.30 | 5.56 |
| Coke | 1.90 | 1.88 |

We claim:

1. A fluid catalytic cracking additive composition to obtain an enhanced yield of liquefied petroleum gas in catalytic cracking of high boiling petroleum feed stocks comprising calcined, spray-dried microspheres, said microspheres having a composition comprising 4 to 20 wt. % Aluminum Phosphate Composite, said composite having a surface area of 3.5 m$^2$/g, a X-ray peak at two-theta value of 16.18°, an Al to PO$_4$ molar ratio of 1:3, and a pH from 0.1 to 2 under spray drier conditions; 1–40 wt. % of crystalline molecular sieve Zeolites selected from the group consisting of mordenite, ZSM-5, Beta and mixtures thereof, and 40–90 wt. % clay, wherein said aluminum phosphate composite is obtained by transformation of an aluminum phosphate precursor slurry.

2. The composition as claimed in claim 1, wherein the clay is Kaolin.

3. The composition as claimed in claim 1, wherein the aluminum phosphate precursor slurry has a solid concentration in the range of 20–80 wt. %.

4. A process for the preparation of a liquid catalytic cracking additive composition to obtain enhanced yield of liquefied petroleum gas in catalytic cracking of high boiling petroleum feed stocks comprising:

i) reacting an aluminum metal powder with phosphoric acid solution containing from 20–86 wt. % H$_3$PO$_4$, to obtain an aluminum phosphate composite having a pH from 0.1 to 2, said composite having a surface area of 3.5 m$^2$/g, a X-ray peak at two-theta value of 16.18°, and an Al to PO$_4$ molar ratio of 1:3;

ii) mixing from 4–20 wt. % of the aluminum phosphate composite with 40–90 wt. % clay and from 1–40 wt. % zeolite to obtain a first mixture;

iii) subjecting the first mixture to high sheer mixing to obtain a second mixture; and iv) subjecting the second mixture to a step of spray drying followed by calcining at a temperature of from 450–600° C. to obtain microspheroidal particles having a size of 20–150 microns and having an attrition index of 3–15.

5. A process for the preparation of a liquid catalytic cracking additive composition to obtain enhanced yield of liquefied petroleum gas in catalytic cracking of high boiling petroleum feed stocks comprising:

i) reacting an aluminum metal powder with phosphoric acid solution containing from 20–86 wt. % H$_3$PO$_4$, to obtain an aluminum phosphate composite having a pH from 0.1 to 2, said composite having a surface area of 3.5 m$^2$/g, a X-ray peak at two-theta value of 16.18°, and an Al to PO$_4$ molar ratio of 1:3;

ii) mixing from 4–20 wt. % of the aluminum phosphate composite with 40–90 wt. % kaolin clay and from 1–40 wt. % ZSM-5 to obtain a first mixture;

iii) subjecting the first mixture to high sheer mixing to obtain a second mixture; and iv) subjecting the second mixture to a step of spray drying followed by calcining at a temperature of from 450–600° C. to obtain microspheroidal particles having a size of 20–150 microns and having an attrition index of 3–15.

* * * * *